July 24, 1962 R. K. H. GEBEL 3,046,333
TRANSISTORIZED AMPLIFIER--TRANSMITTER FOR LOW LIGHT LEVEL TELEVISION CAMERAS
Filed Jan. 29, 1960
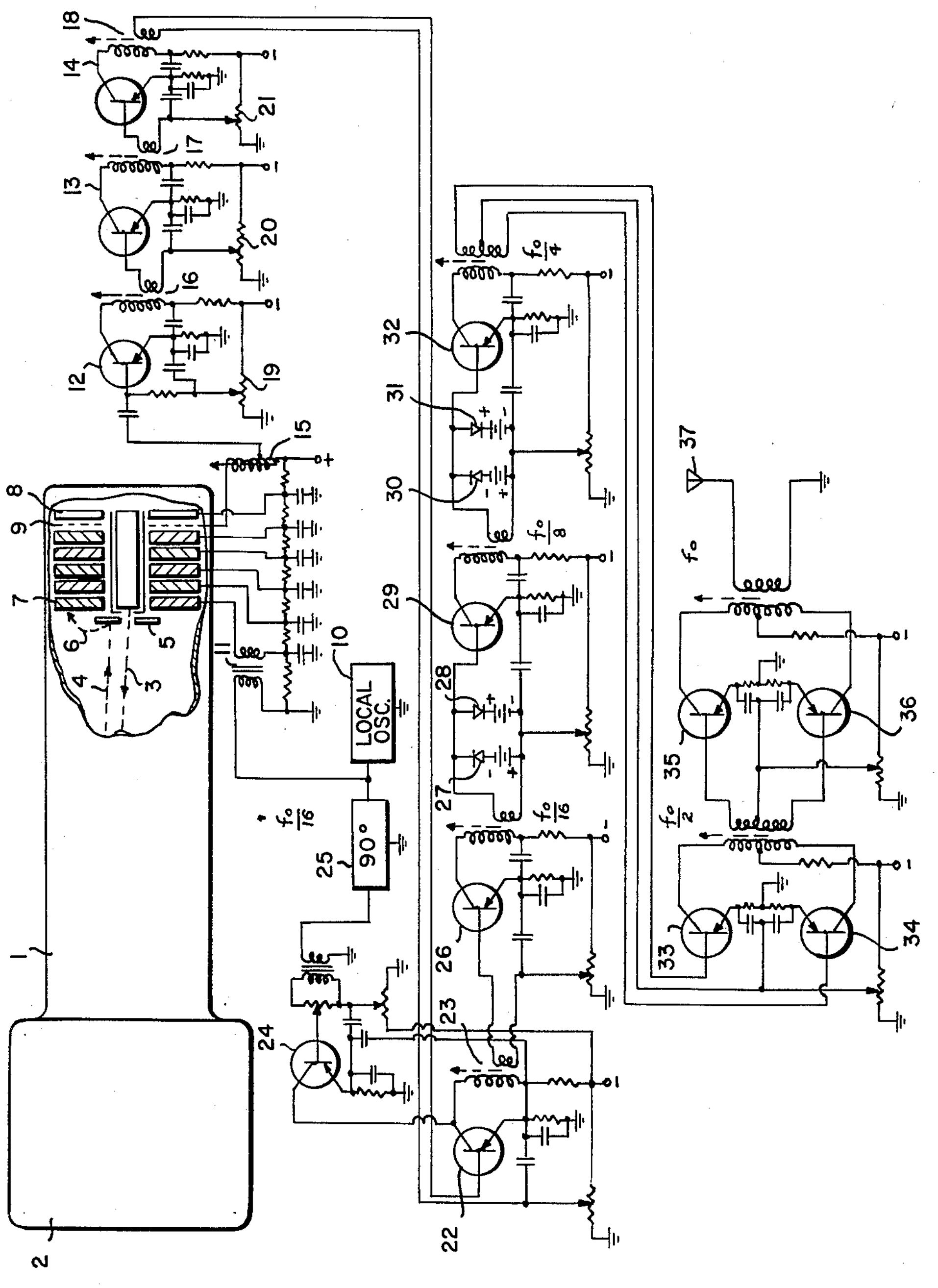
INVENTOR.
R. K. H. GEBEL
BY Wade Koontz
ATTORNEY
and
James S. Shannon
AGENT

United States Patent Office 3,046,333
Patented July 24, 1962

3,046,333
TRANSISTORIZED AMPLIFIER-TRANSMITTER FOR LOW LIGHT LEVEL TELEVISION CAMERAS

Radames K. H. Gebel, Dayton, Ohio, assignor to the United States of America as represented by the Secretary of the Air Force
Filed Jan. 29, 1960, Ser. No. 5,567
2 Claims. (Cl. 178—7.2)
(Granted under Title 35, U.S. Code (1952), sec. 266)

The invention described herein may be manufactured and used by or for the United States Government for governmental purposes without payment to me of any royalty thereon.

The purpose of this invention is to provide the necessary transmitting circuits for a low light level television camera where there are requirements for low power consumption, small size, low distortion and long range, such as exist for a television transmitter to be installed in a satellite.

The requirement for low power consumption and small size dictate the use of transistors in place of vacuum tubes. However, transistors have several disadvantages for use in broad band video amplifiers. Among these are the relatively high base-emitter capacity and the relatively low base-emitter impedance, which create frequency response and impedance matching problems, and the high noise level at frequencies falling within the video band. Another problem is the non-linear distortion produced by transistors in higher level stages of video circuits.

In accordance with the invention, the video signal generated in the television pickup tube is converted into an amplitude modulated radio frequency carrier signal before leaving the tube. Therefore, it is not necessary for the transistors to amplify the extremely broad video band, which extends from the low audio frequency range well into the radio frequency range, but only a relatively narrow band of radio frequency waves. This permits the transistor capacitances to be incorporated in the tuned interstage coupling networks and avoids the frequency distortion that would result if the transistors were required to amplify the wide video band. Also, the noise generated by the transistors falls below the radio frequency band covered by the carrier and its sidebands and is eliminated. Further, in accordance with the invention the amplitude modulated wave is converted to a phase modulated wave at the higher levels to avoid non-linear distortion by the transistors. The phase modulated wave is subsequently limited to remove the amplitude modulation and multiplied in frequency as required to give the desired transmitting frequency at the antenna. Phase modulation is particularly desirable where the transmission is to be over great distances, as in the case of a satellite, since weak phase modulated signals can be more successfully received than weak amplitude modulated signals. Also, where fading is present, due, for example, to tumbling of the satellite, phase modulation is preferable since it permits the use of a faster acting automatic volume control in the receiver.

The invention will be explained in more detail with reference to the specific embodiment thereof illustrated in the accompanying drawing, the single FIGURE of which shows a schematic diagram of the transmitting circuits.

Referring to the drawing, 1 is a television pickup tube illustrated as being of the image orthicon type. The basic principles of these tubes are well known in the art and described in the literature; for example, in an article entitled "The Image Orthicon" by Rose, Weimer and Law appearing in the July 1946, issue of the Proceedings of the Institute of Radio Engineers. The tube 1 is preferably a super sensitive orthicon containing one or more electron image intensifier stages and designed for use with scenes of extremely low light levels, as described in my application, Serial No. 776,659, filed November 26, 1958. However, since the tube's construction and its accessory equipment form no part of the invention, no more is illustrated than is necessary for an understanding of the invention.

As is known, the image orthicon contains a target plate on which is formed a positive charge image of the scene focused on its photocathode located at the end 2 of the tube. The target plate is scanned by a beam of electrons 3 which neutralizes the charge, the electrons in excess of those required for neutralization returning along path 4. The intensity of beam 4 varies in accordance with the charge distribution on the target plate and this variation constitutes the video signal. The returning electrons strike the first dynode 5 of an electron multiplier and liberate secondary electrons 6 therefrom which strike the second dynode 7 and so on until the final dynode 8 is reached, the video signal being amplified at each dynode in proportion to the secondary emission ratio. The amplified electron stream from dynode 8 is collected by the screen electrode 9.

In accordance with the invention, the video signal is caused to amplitude modulate a radio frequency carrier within the pickup tube 1. In the embodiment shown the carrier frequency is $f0/16$, where $f0$ is the frequency at the antenna, and must exceed the highest video frequency preferably by a considerable amount in order to ease the relative band width requirements and to exclude the transistor noise range. For example, for an antenna frequency of 108 mc./s., the carrier frequency is 6.75 mc./s. in the embodiment shown, the carrier frequency is generated by local oscillator 10 and applied by means of transformer 11 to dynode 7, thereby causing its direct potential to vary at the carrier frequency. This in effect varies the secondary emission ratio of dynode 7 since it affects the energy with which the secondary electrons emitted by dynode 6 strike this dynode. The resulting intermodulation of the video and carrier frequencies results in the occurrence, at collector 9, of the original signals, their sum and difference frequencies and certain higher modulation products. The video frequencies and higher modulation products lie outside the pass band of the following amplifier and are eliminated.

The amplitude modulated carrier at the output electrode 9 of the pickup tube is first amplified in a preamplifier comprising transistors 12, 13 and 14. The output electrode 9 of tube 1 is coupled to the base-emitted circuit of transistor 12 by means of a parallel resonant circuit consisting of inductance 15 and the shunt circuit capacitances, the principal components of which are the shunt capacitance of the coil and the base-emitter capacitance of transistor 12. The circuit is tuned by an adjustable core in coil 15 and may be designed to have sufficient bandwith to pass the carrier and its sidebands, in which case the characteristic is centered on the carrier frequency, or the center frequency of the characteristic may be displaced relative to the carrier frequency in a staggered arrangement with interstage resonant coupling circuits 16, 17 and 18 to provide the desired overall bandwidth. The base-emitter circuit impedance of transistor 12 is matched to that of the pickup tube output circuit by coupling the transistor base to an appropriate tap on the inductance 15. Coupling networks 16, 17 and 18 are transformers which, like inductance 15, utilize the circuit shunt capacitances and are tuned by adjustable cores. The turns ratios between primary and secondary windings are made such as to match the base and collector impedances of the transistors.

The preamplifier serves the additional function of increasing the modulation percentage of the carrier. With low light level scenes the modulation percentage of the carrier at output electrode 9 will be very low. The modulation amplitude relative to the carrier amplitude is raised by operating one or more of transistors 12, 13 and 14 at partial cut-off. The base-emitter bias may be adjusted for this purpose by potentiometers 19, 20 and 21.

The amplified amplitude modulated carrier at the secondary of transformer 18 is applied to the base-emitter circuit of transistor 22. The collector of this transistor shares a common output transformer 23 with the collector of transistor 24. The vector sum of the outputs of these transistors therefore appear at the secondary of transformer 23. Transistor 24 is fed with a signal of the carrier frequency, $f0/16$, derived from local oscillator 10 and shifted in phase 90° by network 25. Consequently both a carrier wave of $f0/16$ frequency ampliutde modulated at the video frequency and a 90° phase displaced constant amplitude wave of the same frequency are applied to the primary of transformer. The resultant, which appears at the secondary and is applied to the base-emitter circuit of transistor 26, is a wave of frequency $f0/16$ that is both amplitude and phase modulated in accordance with the video signal.

The amplitude and phase modulated wave is amplified by transistor 26, clipped by biased limiting diodes 27 and 28, amplified further by transistor 29 and subjected to a second clipping action by limiting diodes 30 and 31. This process removes the amplitude modulation from the wave so that the signal applied to the base-emitter circuit of transistor 32 is phase modulated only. After further amplification by transistor 32 and push-pull connected transistors 33—34 and 35—36 the phase modulated radio frequency energy is coupled to antenna 37. Usually it is required that the radiated carrier frequency be considerably higher than the local oscillator frequency. In the embodiment shown the radiated carrier frequency is 16 times the local oscillator frequency. This frequency increase may be accomplished by frequency doubling in an appropriate number of stages. In the embodiment shown, doubling occurs in the stages of transistors 29, 32, 33—34 and 35—36, the interstage transformer coupled to the collector of the transistor in each case being tuned to twice the frequency of the transformer coupled to the base. The transistors in the doubling stages may be operated at partial cut-off by appropriately setting the base-emitter bias in order to generate strong second harmonic frequency waves.

Television pickup tubes of other than the image orthicon type, such as the isocon and vidicon, may, of course, be employed, using a method of introducing the carrier suitable to the tube design. In the isocon the carrier may be applied to a multiplier dynode as in the image orthicon; in the vidicon the carrier may modulate the intensity of the scanning beam.

I claim:

1. A television transmitter comprising: a television pickup tube containing an electron multiplier having several dynodes, the first of which receives an electron stream intensity modulated in accordance with a video signal, and an output electrode; a local oscillator for generating a carrier wave having a frequency considerably higher than the highest frequency of said video signal; means for applying said carrier wave to one of the dynodes of said electron multiplier whereby the signal appearing at said output electrode is said carrier wave amplitude modulated by said video signal; a transistor amplifier, having a pass band sufficient to pass only the band of frequencies constituting said amplitude modulated carrier, having its input connected to said output electrode, said transistor amplifier being biased beyond cut-off for the purpose of increasing the percentage modulation of said carrier; modulating means coupled to the output of said amplifier and to said local oscillator for combining the amplitude modulated carrier output of said amplifier with the carrier wave of said oscillator, with the two carrier waves in phase quadrature, for producing a carrier wave with both amplitude and phase modulation; transistor amplifying and limiting means coupled to the output of said modulating means for removing the amplitude modulation from said amplitude and phase modulated carrier; an antenna; and additional band pass transistor amplifying means connected between the output of said amplifying and limiting means and said antenna.

2. Apparatus as claimed in claim 1 in which said amplifier-limiter and said additional amplifying means each contain a plurality of band pass amplifier stages certain of which are tuned to operate as frequency doublers for raising the carrier frequency at said antenna above the frequency of said local oscillator.

References Cited in the file of this patent

UNITED STATES PATENTS

| | | |
|---|---|---|
| 2,532,793 | Sziklai | Dec. 5, 1950 |
| 2,668,190 | Sziklai | Feb. 2, 1954 |

OTHER REFERENCES

Transistorized Television Cameras Using the Miniature Vidicon, by Flory et al.; reprinted from RCA Review, December 1956, vol. VXII, No. 4 page 472.

Radio Engineers' Handbook, Terman; McGraw-Hill Book Company, Inc., New York, 1943; page 582 (TK6550 T42).